(12) United States Patent  (10) Patent No.: US 6,692,404 B2
Matsubara et al.  (45) Date of Patent: Feb. 17, 2004

(54) ENGINE CONTROL SYSTEM AND METHOD FOR HYBRID VEHICLE

(75) Inventors: Atsushi Matsubara, Utsunomiya (JP); Hironao Fukuchi, Utsunomiya (JP); Kan Nakaune, Kawachi-gun (JP); Shigeo Hidai, Utsunomiya (JP); Yasuo Nakamoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/228,090

(22) Filed: Aug. 27, 2002

(65) Prior Publication Data

US 2003/0054919 A1 Mar. 20, 2003

(30) Foreign Application Priority Data

Aug. 29, 2001 (JP) .......................... 2001-260241

(51) Int. Cl.⁷ .......................... B60K 41/20; B60K 41/28
(52) U.S. Cl. .......................... 477/4; 477/203; 123/198 F
(58) Field of Search ................... 477/183, 203, 477/4, 92; 123/90.15, 198 F; 701/102

(56) References Cited

U.S. PATENT DOCUMENTS

| | | | |
|---|---|---|---|
| 5,695,430 A | * | 12/1997 | Moyer .......................... 477/189 |
| 5,899,828 A | * | 5/1999 | Yamazaki et al. ............. 477/4 |
| 2002/0116099 A1 | * | 8/2002 | Tabata et al. ................. 701/22 |

FOREIGN PATENT DOCUMENTS

| | | |
|---|---|---|
| JP | 53-016123 | 2/1978 |
| JP | 54-057009 | 5/1979 |
| JP | 55-052531 | 4/1980 |
| JP | 57-131840 | 8/1982 |
| JP | 57-195835 | 12/1982 |
| JP | 57-198337 | 12/1982 |
| JP | 59-226238 | 12/1984 |
| JP | 61-14739 | 1/1986 |
| JP | 63-038641 | 2/1988 |
| JP | 63-171636 | 8/1988 |
| JP | 05-321719 | 12/1993 |
| JP | 10-217806 | 8/1998 |
| JP | 2000-97068 | 4/2000 |
| JP | 2000-125405 | 4/2000 |

* cited by examiner

*Primary Examiner*—Ankur Parekh
(74) *Attorney, Agent, or Firm*—Arent Fox Kintner Plotkin & Kahn, PLLC

(57) ABSTRACT

An engine control system for hybrid vehicles, so as to smoothly switch the driving operation from the cylinder-deactivated engine operation, in which at least a part of the total number of cylinders of the engine is deactivated, to the all-cylinder-activated engine operation while considering the driver's intention. When the vehicle is decelerated, the cylinder-deactivated engine operation is performed and regeneration using the motor is performed. The system includes a cylinder deactivation release determining section for releasing the cylinder-deactivated engine operation when an engine speed decreases to a reference engine speed with respect to the cylinder-deactivated engine operation; and a brake operation detecting section for detecting whether a brake pedal is depressed. The cylinder deactivation release determining section includes a cylinder deactivation condition changing section for changing the reference engine speed according to whether the brake pedal is depressed, which is detected by the brake operation detecting section.

6 Claims, 8 Drawing Sheets

ENGINE CONTROL SYSTEM AND METHOD FOR HYBRID VEHICLE

BACKGROUND OF THE INVENTION

1. Field of the Invention

The present invention relates to a control system and method for parallel hybrid vehicles in which cylinders can be deactivated, and in particular, a control system for improving driving performance (called "driveability") when the vehicle is reaccelerated from a cylinder-deactivated engine operation while considering the driver's intention.

2. Description of the Related Art

Conventionally, hybrid vehicles employing an engine and a motor as driving sources are known. Among them, in parallel hybrid vehicles, the output of the engine is assisted by driving the motor.

More specifically, when such a parallel hybrid vehicle is accelerated, the engine output is assisted by driving the motor, and when decelerated, various controls such as battery charging using deceleration regeneration are performed so as to maintain a necessary remaining battery charge (i.e., necessary electrical energy) and also to satisfy the driver's intention. In addition, the parallel hybrid vehicle has a structure in which the engine and the motor are serially arranged; thus, the structure can be simplified so that the total weight of the system can be reduced and the engine and the motor can be flexibly arranged in the vehicle.

In order to remove effects due to the friction of the engine (i.e., engine braking) during deceleration regeneration, a parallel hybrid vehicle having a clutch between the engine and the motor (refer to Japanese Unexamined Patent Application, First Publication No. 2000-97068) or a parallel hybrid vehicle having a structure in which the engine, motor, and transmission are directly and serially coupled are known.

However, in the former example having clutch between the engine and the motor, the structure employing the clutch is complicated and thus the flexibility in arranging each of the structural elements is reduced. Also in this structure using the clutch, the transmission efficiency of the power transmission system is reduced even when the vehicle is running.

On the other hand, in the latter example having a structure in which the engine, motor, and transmission are directly and serially coupled, the amount of regeneration is reduced due to the above-described engine friction; thus, the energy which can be obtained by the regeneration is reduced, so that the amount of driving power assistance by the motor is limited.

Additionally, in the former example, in order to reduce the engine friction during deceleration, an electronic control throttle mechanism may be employed for opening the throttle valve during deceleration so as to considerably reduce pumping loss, thereby increasing the amount of regeneration. However, in this method, a large amount of pre-used air is directly drawn into the exhaust system during deceleration, so that the temperatures of the catalyst and A/F sensor (air-fuel sensor) are decreased and exhaust gas control may not be suitably performed.

In order to solve this problem, a cylinder deactivation technique has become the focus of attention; however, in this case, it is difficult to smoothly switch the driving operation from a cylinder-deactivated engine operation to an all-cylinder-activated engine operation while considering the driver's intention.

SUMMARY OF THE INVENTION

In consideration of the above circumstances, an object of the present invention is to provide an engine control system and method for hybrid vehicles, which uses a cylinder deactivation technique and can smoothly switch the driving operation from the cylinder-deactivated engine operation to the all-cylinder-activated engine operation while considering the driver's intention.

Therefore, the present invention provides an engine control system in a hybrid vehicle including an engine (e.g., an engine E in an embodiment explained below) and a motor (e.g., a motor M in the embodiment explained below) as driving sources, wherein when the vehicle is decelerated, a cylinder-deactivated engine operation, in which at least a part of the total number of cylinders of the engine is deactivated, is performed and regeneration using the motor is performed, the system comprising:

a cylinder deactivation release determining section (e.g., an FIECU 11 in the embodiment explained below) for releasing the cylinder-deactivated engine operation when an engine speed decreases to a reference engine speed (e.g., a lower-limit engine speed NDCSL (for continuing the cylinder-deactivated engine operation) in the embodiment explained below) with respect to the cylinder-deactivated engine operation; and a brake operation detecting section (e.g., a brake switch S4 in the embodiment explained below) for detecting whether a brake pedal is depressed, wherein the cylinder deactivation release determining section includes a cylinder deactivation condition changing section for changing the reference engine speed according to whether the brake pedal is depressed, which is detected by the brake operation detecting section.

According to the above structure, it is possible to detect whether the brake pedal is depressed, by the brake operation detecting section, and to estimate whether the driver intends to stop the vehicle, and based on the estimation, the reference engine speed can be suitably determined by the cylinder deactivation condition changing section. For example, when the brake pedal is depressed, the driver probably intends to stop the vehicle; therefore, the reference engine speed may be set to a lower value. Conversely, when the brake pedal is not depressed, the vehicle may not be stopped and may be reaccelerated; thus, the reference engine speed may be set to a higher value so as to ensure the driveability necessary for reacceleration. Accordingly, the cylinder-deactivated engine operation can be smoothly switched to the all-cylinder-activated engine operation while considering the driver's intention.

As a typical example, the cylinder deactivation condition changing section changes the reference engine speed according to a temperature of an engine oil (e.g., "TOIL" in the embodiment explained below). Accordingly, the reference engine speed can be changed according to the temperature of the engine oil, that is, according to how easily the pressure is applied, which depends to some extent on the viscosity of the oil. Therefore, highly accurate control can be performed according to the thermal conditions of the engine.

As another typical example, the cylinder deactivation release determining section releases the cylinder-deactivated engine operation when a vehicle speed decreases to a reference lower-limit vehicle speed (e.g., a lower-limit brake-off vehicle speed #VPDCSL or a lower-limit brake-on vehicle speed #VPDCSBL in the embodiment explained below) with respect to the cylinder-deactivated engine operation; and the cylinder deactivation condition changing section changes the reference lower-limit vehicle speed according to whether the brake pedal is depressed, which is detected by the brake operation detecting section.

Accordingly, it is possible to detect whether the brake pedal is depressed, by the brake operation detecting section, and to estimate whether the driver intends to stop the vehicle, and based on the estimation, the reference lower-limit vehicle speed can be suitably determined by the cylinder deactivation condition changing section. For example, when the brake pedal is depressed, the driver probably intends to stop the vehicle; therefore, the reference lower-limit vehicle speed may be set to a lower value. Conversely, when the brake pedal is not depressed, the vehicle may not be stopped and may be reaccelerated; thus, the reference lower-limit vehicle speed may be set to a higher value so as to ensure the driveability necessary for reacceleration. Accordingly, the cylinder-deactivated engine operation can be smoothly switched to the all-cylinder-activated engine operation while considering the driver's intention.

The present invention also provides an engine control method used in a hybrid vehicle including an engine and a motor as driving sources, wherein when the vehicle is decelerated, a cylinder-deactivated engine operation, in which at least a part of the total number of cylinders of the engine is deactivated, is performed and regeneration using the motor is performed, the method comprising:

a cylinder deactivation release determining step of releasing the cylinder-deactivated engine operation when an engine speed decreases to a reference engine speed with respect to the cylinder-deactivated engine operation; and a brake operation detecting step of detecting whether a brake pedal is depressed, wherein the cylinder deactivation release determining step includes a cylinder deactivation condition changing step for changing the reference engine speed according to whether the brake pedal is depressed, which is detected in the brake operation detecting step.

The cylinder deactivation condition changing step may include changing the reference engine speed according to a temperature of an engine oil.

As an typical example, the cylinder deactivation release determining step includes releasing the cylinder-deactivated engine operation when a vehicle speed decreases to a reference lower-limit vehicle speed with respect to the cylinder-deactivated engine operation; and the cylinder deactivation condition changing step includes changing the reference lower-limit vehicle speed according to whether the brake pedal is depressed, which is detected in the brake operation detecting step.

DESCRIPTION OF THE PREFERRED EMBODIMENTS

Hereinafter, embodiments according to the present invention will be explained with reference to the drawings.

Figure 1:
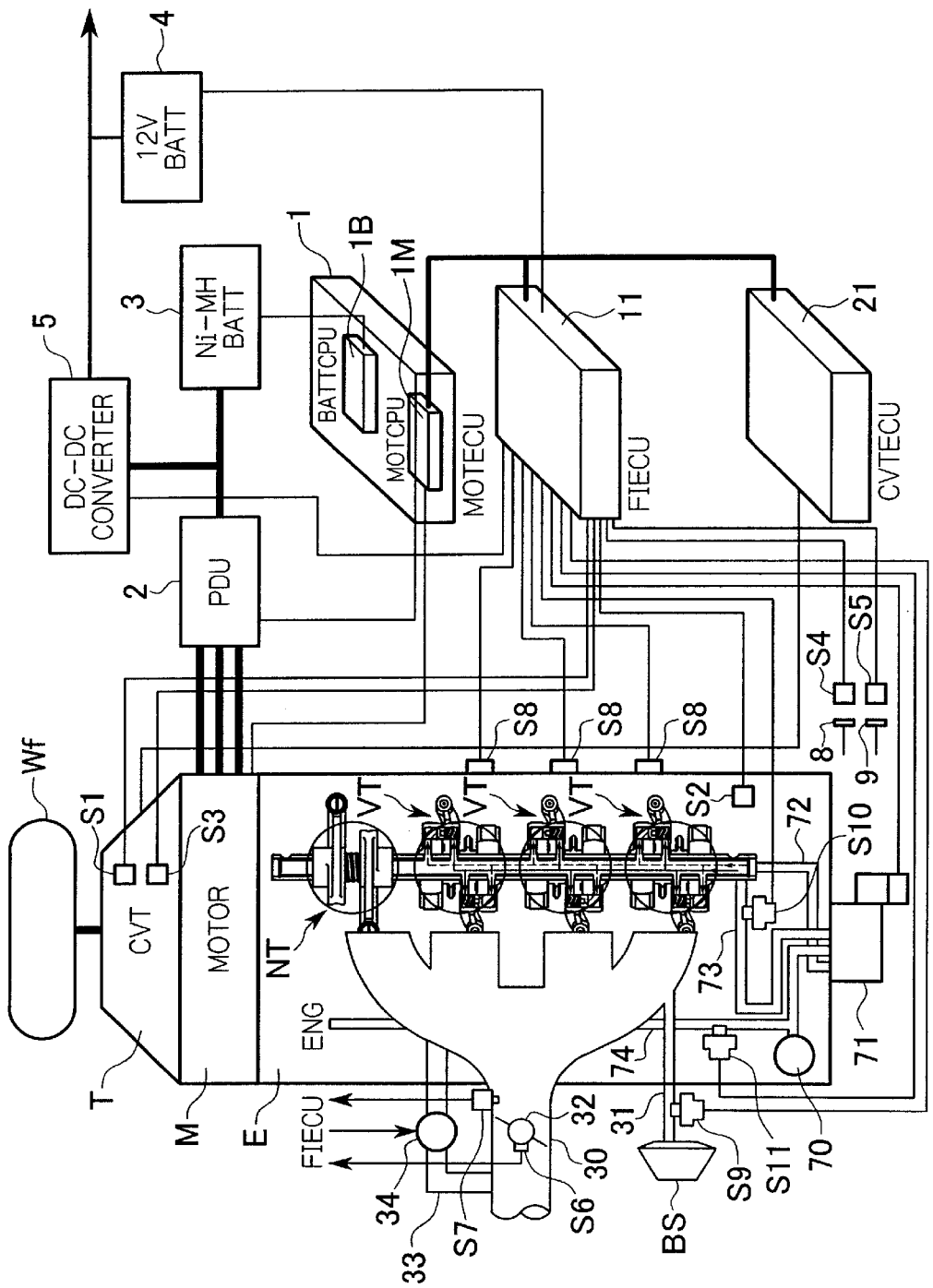
FIG. 1 shows the general structure of a parallel hybrid vehicle as an embodiment of the present invention.

FIG. 1 shows the structure of a parallel hybrid vehicle as an embodiment of the present invention, in which an engine E, a motor M, and a transmission T are directly and serially coupled. The driving force produced by the engine E and the motor M is transmitted via the transmission T such as a CVT (continuously variable transmission) or a manual transmission to front wheels Wf which are driving wheels. When driving force is transmitted from the front wheels Wf to the motor M during deceleration of the hybrid vehicle, the motor M functions as a generator for generating a regenerative braking force, so that the kinetic energy of the vehicle body is stored as electric energy. In FIG. 1, the relevant components of both a manual-transmission vehicle and a CVT vehicle are shown for convenience of explanation.

The driving and regenerating operations of the motor M are performed by a power drive unit (PDU) 2 which receives a control command signal from a motor CPU (central processing unit) 1 M provided in a motor ECU (electrical control unit) 1. A high voltage Ni—H (nickel/hydrogen) battery 3 is connected to the PDU 2, where electrical energy is transmitted between the motor M and the Ni—H battery 3. As an example, the battery 3 includes a plurality of modules connected in series, and in each module, a plurality of cells are connected in series. The hybrid vehicle includes a 12-V auxiliary battery 4 for driving various accessories (or auxiliary devices). The auxiliary battery 4 is connected to the battery 3 via a DC-DC converter (called a "downverter") 5. The DC-DC converter 5, controlled by an FIECU 11, reduces the voltage from the battery 3 so as to charge the auxiliary battery 4. The motor ECU 1 has a battery CPU 1B for protecting the battery 3 and calculating the remaining charge of the battery 3. A CVT ECU 21 for controlling the transmission T (here, CVT) is connected to the transmission T.

The FIECU 11 controls, in addition to the motor ECU I and the DC-DC converter 5, a fuel injection valve (not shown) for controlling the amount of fuel supplied to the engine E, a starter motor (not shown), and ignition timing, etc. Therefore, the FIECU 11 receives (i) a signal from a speed sensor S1 for measuring vehicle speed VP, (ii) a signal from an engine speed sensor S2 for measuring engine speed NE, (iii) a signal from a shift position sensor S3 for detecting the shift position of the transmission T, (iv) a signal from a brake switch S4 (i.e., a brake operation detecting device) for detecting operation of a brake pedal 8, (v) a signal from a clutch switch S5 for detecting the operation of a clutch pedal 9, (vi) a signal from a throttle opening-degree sensor S6 for detecting the degree of throttle (valve) opening TH of a throttle valve 32, (vii) a signal from an air-intake passage negative pressure sensor S7 for measuring the air-intake passage negative pressure, (viii) a signal from a knock sensor S8, and the like.

Reference symbol BS indicates a booster coupled with the brake pedal. A brake-master-power negative pressure sensor S9 for measuring a brake-master-power negative pressure (referred to as "master-power negative pressure" hereinbelow) is attached to the booster BS. This master-power negative pressure sensor S9 is connected to the FIECU 11.

The air-intake passage negative pressure sensor S7 and the throttle opening-degree sensor S6 are attached to an air-intake passage 30, and the master-power negative pressure sensor S9 is attached to a communication passage 31 which is connected to and communicated with the air-intake passage 30.

A second air passage 33 for connecting the upstream and downstream sides of the throttle valve 32 is attached to the air-intake passage 30, and a control valve 34 for opening and closing the second air passage 33 is attached to the passage 33. This second air passage 33 is provided for supplying a small quantity of air to the cylinders even when the throttle valve 32 is totally closed. The opening/closing operation of the control valve 34 is controlled according to a signal from the FIECU 11, where the signal is output based on the air-intake passage negative pressure measured by the air-intake passage negative pressure sensor S7. A POIL sensor S10, a solenoid of a spool valve 71, and a TOIL sensor S11, which will be explained below, are also connected to the FIECU 11. The knock sensor S8 is provided for detecting a misfiring state of a cylinder which has a variable valve timing mechanism VT.

The engine E has three cylinders, which have the variable valve timing mechanisms VT for performing a cylinder-deactivated engine operation, and which are connected to both the air-intake and exhaust systems. The engine E also has another cylinder having a normal valve-operation mechanism NT which does not relate to the cylinder-deactivated engine operation.

That is, in the engine E, the operation can be freely switched between the all-cylinder-activated engine operation, in which the four cylinders (including the three cylinders which can be deactivated) are activated, and the cylinder-deactivated engine operation, in which the above three cylinders are deactivated. More specifically, for each cylinder which can be deactivated, an (air) intake valve IV and an exhaust valve EV can be controlled by the variable valve timing mechanism VT so as to stop the valve operation.

Below, the variable valve timing mechanism VT will be explained in detail with reference to FIGS. 7 to 9.

Figure 7:
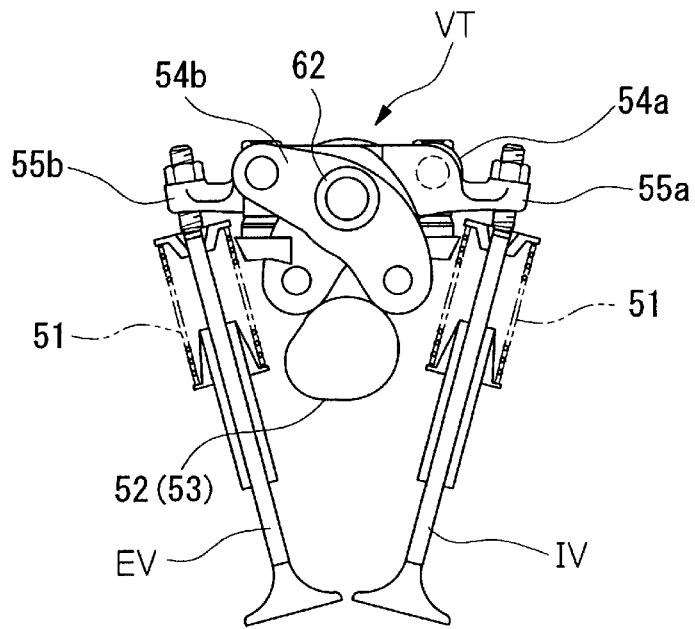
FIG. 7 is a front view showing the variable valve timing mechanism in the embodiment.

FIG. 7 shows an example in which a variable valve timing mechanism VT is applied to an SOHC (single overhead cam shaft) engine so as to perform the cylinder-deactivated engine operation. An intake valve IV and an exhaust valve EV are attached to a cylinder (not shown). The intake and exhaust valves IV and EV are respectively forced via valve springs 51 and 51 to close the intake and exhaust ports (not shown). Reference numeral 52 indicates a lift cam attached to a cam shaft 52. An air-intake cam lift rocker arm 54a and an exhaust cam lift rocker arm 54b are each connected to the lift cam 52, where each rocker arm is rotatably supported via a rocker arm shaft 62.

In addition, valve driving rocker arms 55a and 55b, which are respectively adjacent to the cam lift rocker arms 54a and 54b, are rotatably supported by the rocker arm shaft 62. When an end of the rotatable valve driving rocker arm 55a pushes the upper end of the intake valve IV, the valve IV is opened. Similarly, when an end of the rotatable valve driving rocker arm 55b pushes the upper end of the exhaust valve EV, the valve EV is opened. The base ends of the valve driving rocker arms 55a and 55b (i.e., the opposite ends of the ends which contact the valves) are slidable on a completely round cam 531 attached to a cam shaft 53 (see FIGS. 8A and 8B).

Figure 8A:
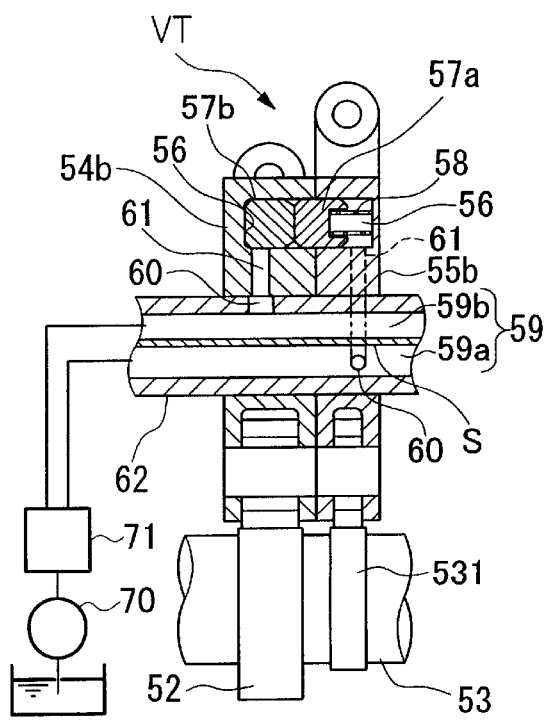
FIG. 8A is a sectional view showing distinctive portions of the variable valve timing mechanism during the all-cylinder-activated engine operation.
Figure 8B:
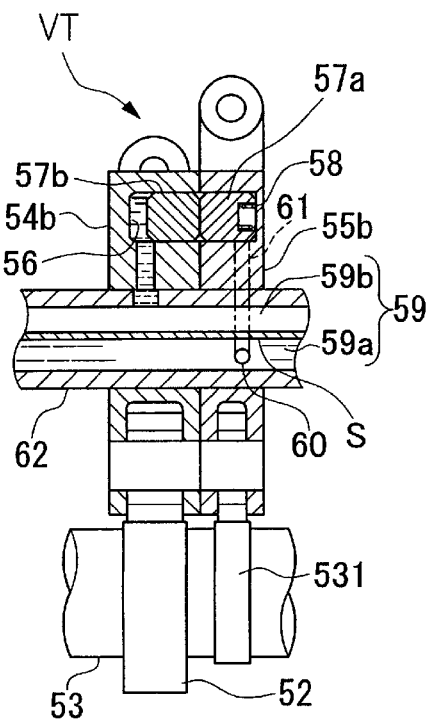
FIG. 8B is a sectional view showing distinctive portions of the variable valve timing mechanism during the cylinder-deactivated engine operation.

FIGS. 8A and 8B show the cam lift rocker arm 54b and the valve driving rocker arm 55b in the exhaust system as an example.

In these figures, a hydraulic chamber 56 is formed in the adjacent cam lift rocker arm 54b and valve driving rocker arm 55b in a manner such that the rocker arm shaft 62 is positioned between the lift cam 52 and the hydraulic chamber 56. In the hydraulic chamber 56, a pin 57a and a release pin 57b are freely slidably inserted, and the pin 57a is forced via a pin spring 58 towards the cam lift rocker arm 54b.

In the rocker arm shaft 62, hydraulic passages 59 (i.e., 59a and 59b) are formed, where the passages 59a and 59b are separated via a partition S. The hydraulic passage 59b is communicated with the hydraulic chamber 56 (here, the release pin 57b side of the chamber) via an opening 60 of the passage 59b and a communication passage 61 of the cam lift rocker arm 54b. The hydraulic passage 59a is communicated with the hydraulic chamber 56 (here, the pin 57a side of the chamber) via an opening 60 of the passage 59a and a communication passage 61 of the valve driving rocker arm 55b. Each hydraulic passage can be connected to a drain passage (not shown).

When no oil pressure is applied from the hydraulic passage 59b, the pin 57a contacts both the cam lift rocker arm 54b and the valve driving rocker arm 55b by the pin spring 58, as shown in FIG. 8A. Conversely, when a signal for deactivating the cylinder is output and oil pressure is applied from the hydraulic passage 59b, the pin 57a slides to the valve driving rocker arm 55b side together with the release pin 57b while opposing the pin spring 58, as shown in FIG. 8B. Accordingly, the boundary position between the pin 57a and the release pin 57b matches the boundary position between the cam lift rocker arm 54b and the valve driving rocker arm 55b, so that the coupling condition of both arms is released. The exhaust system has a similar structure and mechanism. In addition, the hydraulic passages 59a and 59b are connected to an oil pump 70 via a spool valve 71 for maintaining the oil pressure applied to the variable valve timing mechanism VT.

Figure 9:
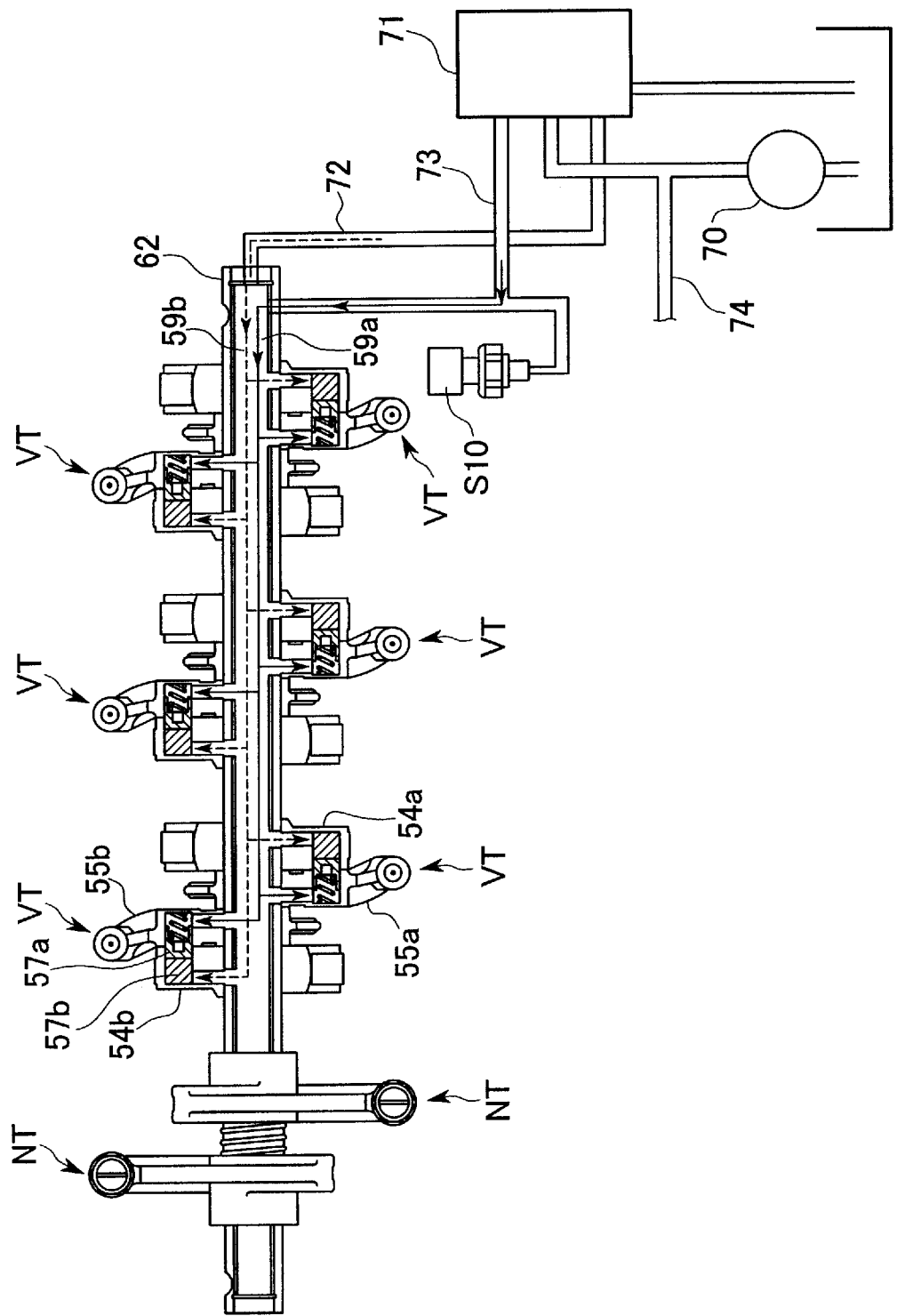
FIG. 9 is a partially enlarged view of FIG. 1.

As shown in FIG. 9, the cylinder deactivation passage 72 of the spool valve 71 is connected to the hydraulic passage 59b of the rocker arm shaft 62, and the cylinder deactivation release passage 73 of the spool valve 71 is connected to the hydraulic passage 59a. The POIL sensor S10 is attached to the cylinder deactivation release passage 73. The POIL sensor S10 is provided for monitoring the oil pressure of the cylinder deactivation release passage 73, where the oil pressure is low in the cylinder-deactivated engine operation, while the pressure is high in the all-cylinder-activated engine operation. In addition, a supply passage 74 which functions as a drain passage of the oil pump 70, is provided as a branch passage of the passage between the oil pump 70 and the spool valve 71, so as to supply working oil to the engine E. The TOIL sensor S11 (see FIG. 1) for monitoring the temperature of the supplied working oil is attached to the supply passage 74.

Therefore, when the specific conditions (explained below) for performing the cylinder-deactivated engine operation are satisfied, the spool valve 71 is operated according to a signal from the FIECU 11, so that in each of the air-intake and exhaust systems, oil pressure is applied via the oil pump 70 from the hydraulic passage 59b to the hydraulic chamber 56.

Accordingly, in the air-intake system, the pin 57a and the release pin 57b, by which the cam lift rocker arm 54a and the valve driving rocker arm 55a are coupled together, slide towards the valve driving rocker arm 55a, thereby releasing the coupling state of the cam lift rocker arm 54a and the valve driving rocker arm 55a. Therefore, the cam lift rocker arm 54a moves according to the rotation of the lift cam 52; however, the movement is not transmitted to the valve driving rocker arm 55a whose coupling state with the cam lift rocker arm 54a has been released due to the sliding of the pin 57a and the release pin 57b.

Similarly, in the exhaust system, the pin 57a and the release pin 57b, by which the cam lift rocker arm 54b and the valve driving rocker arm 55b are coupled together, slide towards the valve driving rocker arm 55b, thereby releasing the coupling state of the cam lift rocker arm 54b and the valve driving rocker arm 55b. The cam lift rocker arm 54b also moves according to the rotation of the lift cam 52; however, the movement is not transmitted to the valve driving rocker arm 55b which is not coupled with the cam lift rocker arm 54b.

Therefore, the valve driving rocker arms 55a and 55b in the air-intake and exhaust systems are not driven, so that the valves IV and EV are maintained in the closed state and the cylinder-deactivated engine operation is possible.

Cylinder-Deactivated Engine Operation Switching Process

Below, with reference to FIG. 2, the deceleration cylinder-deactivated engine operation switching process (performed by the FIECU 11) will be explained.

The deceleration cylinder-deactivated engine operation (corresponding to the cylinder-deactivated engine operation) means an operation in which the intake and exhaust valves are closed during deceleration regeneration by using the variable valve timing mechanism VT under specific conditions, and this operation is executed for reducing the engine friction and increasing the amount of the deceleration regeneration. In the flowchart which will be explained below, a flag (i.e., cylinder-deactivated engine operation executing flag F_DECCS) for switching the operation between the cylinder-deactivated engine operation and the all-cylinder-activated engine operation (in which no cylinders are deactivated) is provided, and the setting/resetting operation of this flag is periodically performed at a specific interval.

Figure 2:
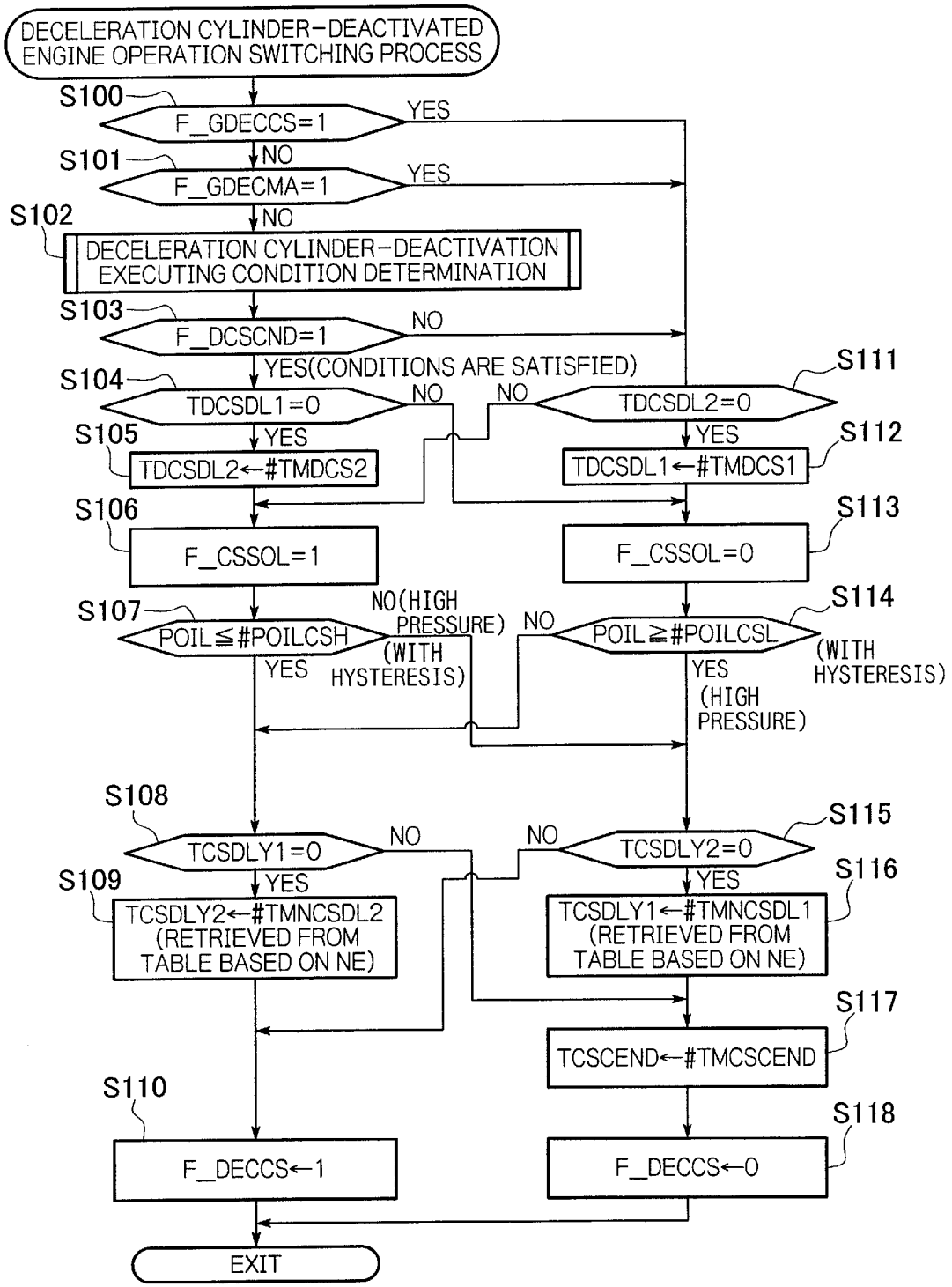
FIG. 2 is a flowchart showing the deceleration cylinder-deactivated engine operation switching process performed in the embodiment.

In the first step S100 in FIG. 2, it is determined whether the value of a cylinder deactivation release request flag F_GDECCS, used when the deceleration G is excessive, is 1. If the result of the determination is "YES", the operation proceeds to step S111, while if the result of the determination is "NO", the operation proceeds to step S101.

In step S101, it is determined whether a deceleration regeneration release request flag F_GDECMA, used when deceleration G is excessive, is 1. If the result of the determination is "YES", the operation proceeds to step S111, while if the result of the determination is "NO", the operation proceeds to step S102.

The reason for providing the above step S100 is that when the stopping of the vehicle is a matter of the highest priority, no cylinder-deactivated engine operation is preferable. In addition, braking with an excessive deceleration G decreases the master-power negative pressure and in this case, the cylinder-deactivated engine operation may probably return to the all-cylinder-activated engine operation. Therefore, when such braking with an excessive deceleration G is performed, the cylinder-deactivated engine operation is released in advance.

The reason for providing the above step S101 is that when an excessive deceleration is applied, no cylinder-deactivated engine operation is preferable so as to prevent the wheels from skidding.

In step S102, a deceleration cylinder-deactivation executing condition determining process (explained below) is performed, and the operation proceeds to step S103.

In step S103, it is determined whether the value of a deceleration cylinder-deactivation condition satisfied flag F_DCSCND is 1. If the result of the determination is "NO" (i.e., the conditions for executing the cylinder-deactivated engine operation are not satisfied), the operation proceeds to step S111, while if the result of the determination is "YES" (i.e., the conditions for executing the cylinder-deactivated engine operation are satisfied), the operation proceeds to step S104.

In step S104, it is determined whether the timer value of a solenoid ON delay timer TDCS (explained below) is 0. If the result of the determination is "YES", a specific time has elapsed; thus, the operation proceeds to step S105. If the result of the determination of step S104 is "NO", the specific time has not yet elapsed; thus, the operation proceeds to step S113.

In step S105, a solenoid OFF delay timer TDCSDL2, provided for the spool valve 71, is set to a predetermined value ™TMDCS2, and the operation proceeds to step S106. This step S105 is executed when the cylinder-deactivated engine operation is switched to the all-cylinder-activated engine operation, and this step is provided for securing a predetermined time from the completion of the determination of step S103 to the termination of the OFF state of the solenoid of the spool valve 71.

In step S106, the value of a cylinder deactivation solenoid flag F_CSSOL is set to 1 (i.e., the solenoid (of the spool valve 71) for cylinder deactivation is energized), and the operation proceeds to step S107.

In step S107, it is determined by using the POIL sensor S10 whether the necessary oil pressure has been actually produced by the energizing of the above solenoid for cylinder deactivation. More specifically, it is determined whether the engine oil pressure POIL is equal to or lower than an oil pressure #POILCSH defined for determining the execution of the cylinder-deactivated engine operation. If the result of the determination is "YES", the operation proceeds to step S108, while if the result of the determination is "NO" (here, hysteresis is considered) and the engine oil pressure is high, the operation proceeds to step S115. Here, instead of the POIL sensor S110, an oil pressure switch may be used for the above determination.

In step S1108, it is determined whether the timer value of a cylinder-deactivated engine operation executing delay timer TCSDLY1 is 1. This timer is provided for securing the time from when the spool valve 71 is energized (i.e., set on) to the application of the oil pressure. If the result of the determination is "YES", the operation proceeds to step S109, while if the result of the determination is "NO", the operation proceeds to step S117.

In step S109, the timer value of a cylinder-deactivated engine operation release delay timer TCSDLY2 is set to #TMNCSDL2 which is selected according to the engine speed NE from among the data stored in a specific table. The reason for selecting the timer value according to the engine speed NE is that the response time for changes of the oil pressure depends on the engine speed NE. Therefore, the lower the engine speed NE, the larger the timer value #TMNCSDL2 is.

In step S110, the value of a cylinder-deactivated engine operation executing flag F_DECCS is set to 1 (i.e., the deceleration cylinder-deactivated engine operation is being executed), and the control operation of this flow is completed.

In step S111, it is determined whether the timer value of the solenoid OFF delay timer TDCSDL2 is 0. If the result of the determination is "YES", the relevant predetermined time has elapsed; thus, the operation proceeds to step S112. If the result of the determination of step S111 is "NO", the predetermined time has not yet elapsed; thus, the operation proceeds to step S106.

In step S112, the timer value of the solenoid ON delay timer TDCSDL1 (for the solenoid of the spool valve 71) is set to a predetermined value #TMDCS1, and the operation proceeds to step S113. As for the shift from the all-cylinder-activated engine operation to the cylinder-deactivated engine operation, step S112 is provided for securing a specific time from the completion of the determination of step S103 to the start of energizing the solenoid of the spool valve 71 (see step S106).

In step S113, the value of the cylinder deactivation solenoid flag F_CSSOL is set to 0 (i.e., the solenoid (of spool valve 71) for cylinder deactivation is set off), and the operation proceeds to step S114.

In step S114, it is determined by using the POIL sensor S10 whether the oil pressure has actually been released due to the above solenoid set-off operation for releasing the cylinder deactivation. More specifically, it is determined whether the oil pressure POIL is equal to or higher than a cylinder-deactivated engine operation release determining oil pressure #POILCSL. If the result of the determination is "YES" (i.e., the oil pressure is sufficiently high (here, hysteresis is considered)), the operation proceeds to step S115. If the result of the determination of step S114 is "NO", the operation proceeds to step S108. Also in this case, an oil pressure switch may be used instead of the POIL sensor S10.

In step S115, it is determined whether the timer value of the cylinder-deactivated engine operation release delay timer TCSDLY2 is 0. This timer is provided for securing the time from when the spool valve 71 is set off to the release of the oil pressure. If the result of the determination is "YES", the operation proceeds to step S116, while if the result of the determination is "NO", the operation proceeds to step S110.

In step S116, the timer value of the cylinder-deactivated engine operation executing delay timer TCSDLY1 is set to #TMNCSDL1 which is selected according to the engine speed NE from among the data stored in a specific table. The reason for selecting the timer value according to the engine speed NE is that the response time for changes of the oil pressure depends on the engine speed NE. Therefore, the lower the engine speed NE, the larger the timer value #TMNCSDL1 is. The operation then proceeds to step S117.

In step S117, the timer value of a cylinder-deactivated engine operation forcible release timer TCSCEND is set to #TMCSCEND, and the operation proceeds to step S118. This timer TCSCEND is provided for forcibly releasing the cylinder-deactivated engine operation when a specific time has elapsed after the start of the cylinder-deactivated engine operation.

In step S118, the value of the cylinder-deactivated engine operation executing flag F_DECCS is set to 0 (which indicates that the normal operation is executed).

Deceleration Cylinder-Deactivation Executing Condition Determining Process

Below, with reference to FIGS. 3 to 5, the deceleration cylinder-deactivation executing condition determining process in step S102 of FIG. 2 will be explained. In this process, it is continuously monitored whether the conditions for the deceleration cylinder-deactivated engine operation are satisfied, and a deceleration cylinder-deactivation condition satisfied flag F_DCSCND is set or reset according to the monitored result. This process is periodically repeated at a specific interval.

Figure 3:
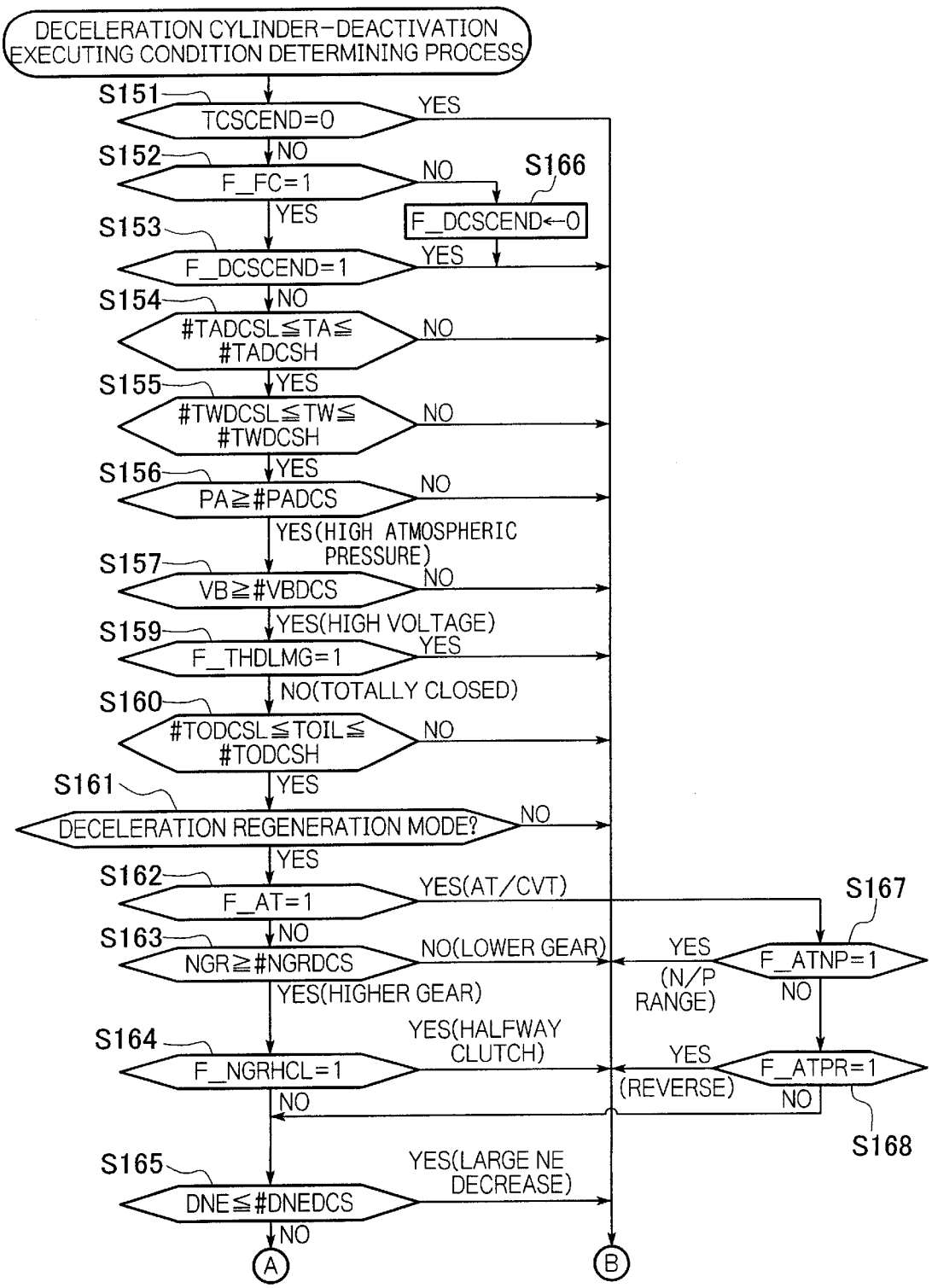
FIG. 3 is a flowchart showing the deceleration cylinder-deactivation executing condition determining process performed in the embodiment.
Figure 4:
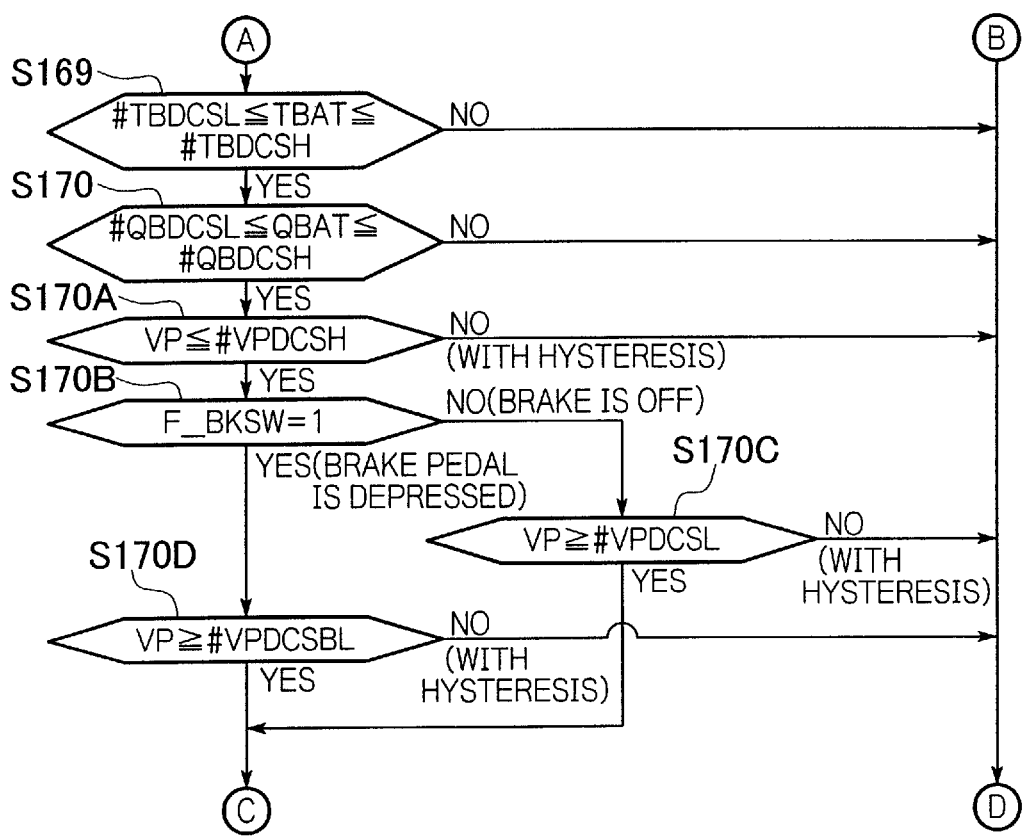
FIG. 4 is also a flowchart showing the deceleration cylinder-deactivation executing condition determining process performed in the embodiment.

In step S151 in FIG. 3, it is determined whether the timer value of the cylinder-deactivated engine operation forcible release timer TCSCEND is 0. If the result of the determination is "YES", the operation proceeds to step S184 in FIG. 5, while if the result of the determination is "NO", the operation proceeds to step S152. This is because when the timer value of the cylinder-deactivated engine operation forcible release timer TCSCEND reaches 0, the cylinder deactivation should be released.

In step S152, it is determined whether the value of a fuel-cut flag F_FC is 1.

If the result of the determination is "YES", the operation proceeds to step S153, while if the result of the determination is "NO", the operation proceeds to step S166. The reason for providing step S152 is that the cylinder-deactivated engine operation is executed so as to reduce the engine friction due to the fuel cut in deceleration and to increase the amount of regeneration by an amount corresponding to the reduction of the engine friction.

Figure 5:
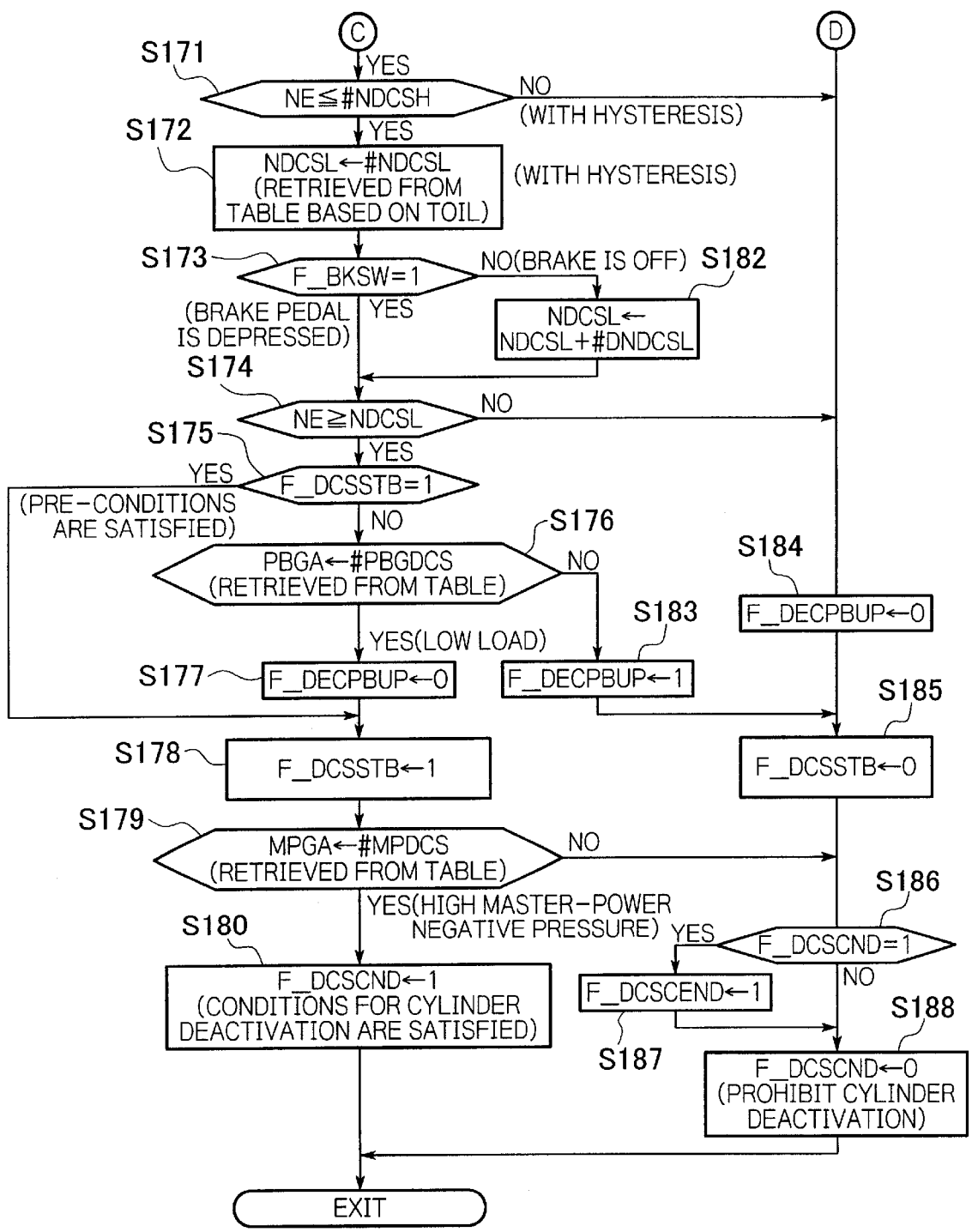
FIG. 5 is also a flowchart showing the deceleration cylinder-deactivation executing condition determining process performed in the embodiment.

In step S166, the value of a cylinder deactivation termination flag F_DCSCEND is set to 0, and the operation proceeds to step S1184 in FIG. 5.

In step S153, it is determined whether the value of the cylinder deactivation termination flag F_DCSCEND is 1. If the result of the determination is "YES", the operation proceeds to step S184 in FIG. 5, while if the result of the determination is "NO", the operation proceeds to step S154.

In step S154, it is determined whether the temperature TA of the outside air (called the "outside air temperature" hereinbelow) is within a predetermined range defined for executing the cylinder-deactivated engine operation, that is, whether a lower-limit outside air temperature #TADCSL<TA<an upper-limit outside air temperature #TADCSH. If it is determined in step S154 that the outside air temperature TA is within the predetermined range, the operation proceeds to step S155, while if it is determined that the outside air temperature TA is not within the predetermined range, the operation proceeds to step S184 in FIG. 5. This is because the engine operation is unstable if the cylinder-deactivated engine operation is executed while the outside air temperature is lower than the lower-limit outside air temperature #TADCSL or higher than the upper-limit outside air temperature #TADCSH.

In step S155, it is determined whether a temperature TW of the cooling water (called the "cooling water temperature" hereinbelow) is within a predetermined range defined for executing the cylinder-deactivated engine operation, that is, whether a lower-limit cooling water temperature #TWDCSL≦TW≦an upper-limit cooling water temperature #TWDCSH. If it is determined in step S155 that the cooling water temperature TW is within the predetermined range, the operation proceeds to step S156, while if it is determined that the outside air temperature TW is not within the predetermined range, the operation proceeds to step S184 in FIG. 5. This is because the engine operation is unstable if the cylinder-deactivated engine operation is executed while the cooling water temperature is lower than the lower-limit outside air temperature #TWDCSL or higher than the upper-limit outside air temperature #TWDCSH.

In step S156, it is determined whether the atmospheric pressure PA is equal to or higher than an upper-limit atmospheric pressure #PADCS defined for executing the cylinder-deactivated engine operation. If the result of the determination S156 is "YES" (i.e., the atmospheric pressure is sufficiently high), the operation proceeds to step S157, while if the result of the determination is "NO", the operation proceeds to step S184 in FIG. 5. It is not preferable to execute the cylinder-deactivated engine operation while the atmospheric pressure is low because the brake-master-power negative pressure may be insufficient when the brake is started.

In step S157, it is determined whether a voltage VB of the 12-V auxiliary battery 4 is equal to or higher than an upper-limit voltage #VBDCS defined for executing the cylinder-deactivated engine operation. If the result of the determination is "YES" (i.e., the voltage is sufficiently high), the operation proceeds to step S159, while if the result of the determination is "NO", the operation proceeds to step S184 in FIG. 5. This is because when the voltage VB of the 12-V auxiliary battery 4 is low, the spool valve 71 has a low responsiveness. The determination of step S157 is also performed in consideration of voltage drop of the battery in a low-temperature atmosphere or battery deterioration.

In step S159, it is determined whether the value of an idle state determination flag F_THIDLMG is 1. If the result of the determination is "YES" (in this case, the throttle valve is not totally closed), the operation proceeds to step S160, while if the result of the determination is "NO" (in this case, the throttle valve is totally closed), the operation proceeds to step S160. This is because when the throttle valve is opened even slightly from the totally closed state, the cylinder-deactivated engine operation is released, for improving the quality and performance of the vehicle.

In step S160, it is determined whether the temperature TOIL of the engine oil (called the "oil temperature", hereinbelow) is within a predetermined range defined for executing the cylinder-deactivated engine operation, that is, whether a lower-limit oil temperature #TODCSL <TOIL <an upper-limit oil temperature #TODCSH. If it is determined in step S160 that the oil temperature TOIL is within the predetermined range, the operation proceeds to step S161, while if it is determined that the oil temperature TOIL is not within the predetermined range, the operation proceeds to step S184 in FIG. 5. This is because the response characteristics of switching between the normal engine operation and the cylinder-deactivated engine operation are not stable if the cylinder-deactivated engine operation is executed while the oil temperature TOIL is lower than the lower-limit oil temperature #TODCSL or higher than the upper-limit oil temperature #TODCSH.

In step S161, it is determined whether the deceleration regeneration is being executed. If the result of the determination is "YES", the operation proceeds to step S1162, while if the result of the determination is "NO", the operation proceeds to step S1184 in FIG. 5. This is because the cylinder-deactivated engine operation is executed for reducing the engine friction produced during deceleration regeneration and for increasing the amount of deceleration regeneration by an amount corresponding to the reduced engine friction.

In step S162, it is determined whether the value of an MT/CVT determination flag F_AT is 1. If the result of the determination is "NO" (i.e., MT (manual transmission) vehicle), the operation proceeds to step S163, while if the result of the determination is "YES" (i.e., AT/CVT (automatic transmission or CVT) vehicle), the operation proceeds to step S167.

In step S167, it is determined whether the value of an in-gear determination flag F_ATNP is 1. If the result of the determination is "NO" (i.e., in-gear), the operation proceeds to step S168, while if the result of the determination is "YES" (i.e., N/P (neutral or parking) gear position), the operation proceeds to step S184 in FIG. 5.

In step S168, it is determined whether the value of a reverse position determination flag F_ATPR is 1. If the result of the determination is "YES" (i.e., reverse position), the operation proceeds to step S184 in FIG. 5, while if the result of the determination is "NO" (i.e., the gear position is other than the reverse position), the operation proceeds to step S165.

According to the above steps S167 and S168, the cylinder-deactivated engine operation is released when the gear is in the N/P range or in reverse.

In step S163, it is determined whether the preceding gear position NGR (i.e., the gear position preceding to the current gear position) is equal to or higher than a lower-limit gear position #NGRDCS (e.g., the third gear position) for continuing the cylinder-deactivated engine operation. If the result of the determination is "YES" (i.e., higher-gear side), the operation proceeds to step S1164, while if the result of the determination is "NO" (i.e., lower gear side), the operation proceeds to step S184 in FIG. 5. This step is provided to prevent frequent switching to the cylinder-deactivated engine operation due to decrease of the regeneration rate, traffic congestion, or the like.

In step S164, it is determined whether the value of a halfway clutch determining flag F_NCRHCL is 1, where the value of 1 indicates that the clutch is half engaged (i.e., the clutch is halfway in). If the result of the determination is "YES", the operation proceeds to step S184 in FIG. 5, while if the result of the determination is "NO", the operation proceeds to step S165. Therefore, it is possible to prevent the following problems due to unnecessary cylinder deactivation, that is, (i) engine stalling which may occur when the clutch is halfway in so as to stop the vehicle, or (ii) a situation in which the driver's intent to accelerate is not met when the clutch is halfway in so as to change the gear in acceleration.

In step S165, it is determined whether a rate of change DNE of the engine speed is equal to or smaller than an upper-limit rate of change #DNEDCS defined for continuing the cylinder-deactivated engine operation. If the result of the determination is "YES" (i.e., the rate of decrease of the engine speed is large), the operation proceeds to step S184 in FIG. 5, while if the result of the determination is "NO", the operation proceeds to step S169. This step is provided to prevent engine stalling which may occur due to the cylinder-deactivated engine operation executed when the rate of decrease of the engine speed is large.

In step S169 in FIG. 4, it is determined whether the temperature TBAT of the battery 3 (called the "battery temperature" hereinbelow) is within a predetermined range defined for the cylinder-deactivated engine operation, that is, whether a lower-limit battery temperature #TBDCSL≦TBAT≦an upper-limit oil temperature #TBDCSH. If the result of the determination is "YES", the operation proceeds to step S170, while if the result of the determination is "NO", the operation proceeds to step S184 in FIG. 5. This is because the cylinder-deactivated engine operation should not be executed when the temperature of the battery 3 is not within the predetermined range.

In step S170, it is determined whether the remaining battery charge QBAT of the battery 3 is within a predetermined range defined for continuing the cylinder-deactivated engine operation, that is, whether a lower-limit remaining battery charge #QBDCSL≦QBAT≦an upper-limit remaining battery charge #QBDCSH. If it is determined in step S170 that the remaining battery charge QBAT is within the predetermined range, the operation proceeds to step S170A, while if it is determined that the remaining battery charge QBAT is not within the predetermined range, the operation proceeds to step S184 in FIG. 5. That is, if the remaining battery charge QBAT is lower than the lower-limit remaining battery charge #QBDCSL or higher than the upper-limit remaining battery charge #QBDCSH, the cylinder-deactivated engine operation is released. This is because if the remaining battery charge QBAT is too low, the energy necessary for the motor to assist the engine output cannot be obtained when the operation mode returns from the cylinder-deactivated engine operation. On the other hand, if the remaining battery charge QBAT is too high, regeneration cannot be realized.

In step S170A, it is determined whether the vehicle speed VP is equal to or lower than an upper-limit vehicle speed #VPDCSH defined for continuing the cylinder-deactivated engine operation. If the result of the determination is "YES", the operation proceeds to step S170B, while if the result of the determination is "NO" (with hysteresis (i.e., hysteresis is considered)), the operation proceeds to step S184 in FIG. 5.

In step S170B, it is determined whether the value of a brake switch flag F_BKSW is 1. If the result of the determination is "YES" (i.e., the brake pedal is depressed), the operation proceeds to step S170D, while if the result of the determination is "NO" (i.e., the brake pedal is not depressed), the operation proceeds to step S170C. Instead of employing the brake switch flag F_BKSW, the depression of the brake pedal may be determined according to results of detection of the deceleration state (i.e., deceleration G) of the vehicle.

In step S170C, it is determined whether the vehicle speed VP is equal to or higher than a lower-limit brake-off vehicle speed #VPDCSL (e.g., 30 km/h) defined for continuing the cylinder-deactivated engine operation while the brake is off. If the result of the determination is "YES", the operation proceeds to step S171 in FIG. 5, while if the result of the determination is "NO" (with hysteresis), the operation proceeds to step S184 in FIG. 5.

In step S170D, it is determined whether the vehicle speed VP is equal to or higher than a lower-limit brake-on vehicle speed #VPDCSBL (e.g., 10 km/h) defined for continuing the cylinder-deactivated engine operation while the brake is on. If the result of the determination is "YES", the operation proceeds to step S171 in FIG. 5, while if the result of the determination is "NO" (with hysteresis), the operation proceeds to step S184 in FIG. 5.

As explained above, the lower-limit vehicle speed for continuing the cylinder-deactivated engine operation has different values in the brake-on and the brake-off states. This is because when the brake is on, the driver probably intends to stop the vehicle, and when the brake is off, the driver may intend to reaccelerate the vehicle. Therefore, the lower-limit brake-off vehicle speed #VPDCSL is set to be higher than the lower-limit brake-on vehicle speed #VPDCSBL, so that the cylinder-deactivated engine operation is much more easily started in the brake-on state, in comparison with the brake-off state, and that the driver's intention to reaccelerate the vehicle can be smoothly implemented so as to improve the driveability (i.e., driving performance). Accordingly, the reference lower-limit vehicle speed of the present invention can be defined by the lower-limit brake-off vehicle speed #VPDCSL and the lower-limit brake-on vehicle speed #VPDCSBL.

In step S171, it is determined whether the engine speed NE is equal to or lower than a predetermined value, that is, an upper-limit engine speed #NDCSH defined for continuing the cylinder-deactivated engine operation. According to this step, if it is determined that the engine speed NE is equal to or lower than the predetermined value, the operation proceeds to step S172, while if it is determined that the engine speed NE is higher than the predetermined value (with hysteresis), the operation proceeds to step S184. This is because if the engine speed is too high, the oil pressure may be too high due to the high-speed rotation and switching for the cylinder-deactivated engine operation may not be executed.

Figure 6:
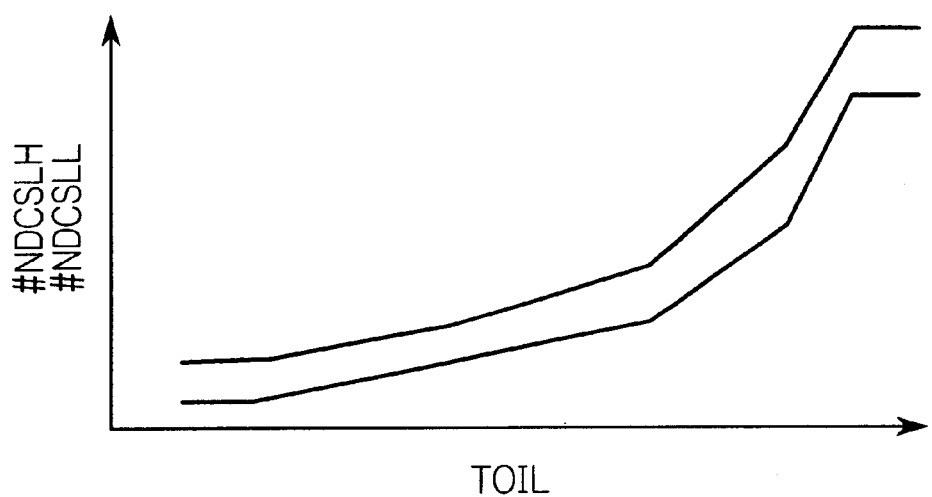
FIG. 6 is a graph showing a relationship between the temperature of the engine oil and the lower-limit engine speed for continuing the cylinder-deactivated engine operation.

In step S172, the lower-limit engine speed NDCSL (i.e., reference engine speed) for continuing the cylinder-deactivated engine operation is set to #NDCSL which is selected according to the oil temperature TOIL from among the data stored in a specific table, and the operation proceeds to step S1734. The reason for selecting #NDCSL according to the oil temperature TOIL is that the higher the oil temperature (of the engine oil), the lower the viscosity is, and as the viscosity decreases, the application of the pressure is more difficult. Therefore, the return operation from the cylinder-deactivated engine operation should be executed while the engine speed NE is maintained at a specific level. Accordingly, highly accurate control can be performed according to the oil temperature TOIL, that is, the thermal conditions of the engine. The value #NDCSL for the lower-limit engine speed NDCSL has hysteresis as shown in FIG. 6 (i.e., #NDCSLL (lower values) and #NDCSLH (higher values)) and increases according to the oil temperature TOIL.

Instead of using the oil temperature TOIL, the lower-limit engine speed NDCSL may be set based on the engine water temperature or the temperature of the engine itself.

In step S173, it is determined whether the value of a brake switch flag F_BKSW is 1. If the result of the determination is "YES" (i.e., the brake pedal is depressed), the operation proceeds to step S174, while if the result of the determination is "NO" (i.e., the brake pedal is not depressed), the operation proceeds to step S182. As explained above, instead of employing the brake switch flag F_BKSW, the depression of the brake pedal may be determined according to results of detection of the deceleration state (i.e., deceleration G) of the vehicle.

In step S182 (for changing the condition for performing the cylinder-deactivated engine operation), the lower-limit engine speed NDCSL for continuing the cylinder-deactivated engine operation is increased by a predetermined value #DNDCSL, and the operation proceeds to step S174. That is, the brake depression or non-depression is detected so as to estimate whether the driver intends to stop the vehicle, and the lower-limit engine speed NDCSL is increased by the predetermined value #DNDCSL so that the cylinder-deactivated engine operation is much more easily started while the brake is on, in comparison with the brake-off state, and that the driver's intention of reaccelerating the vehicle can be smoothly implemented and the driveability can be improved.

Instead of increasing the lower-limit engine speed NDCSL by #DNDCSL, the lower-limit engine speed NDCSL may be changed by multiplying NDCSL by a coefficient or by referring to a data map provided for changing NDCSL.

In step S174 (for determining release of the cylinder-deactivated engine operation), it is determined whether the engine speed NE is equal to or higher than the lower-limit engine speed NDCSL for continuing the cylinder-deactivated engine operation. If the result of the determination is "YES", the operation proceeds to step S175, while if the result of the determination is "NO", the operation proceeds to step S184.

In step S175, it is determined whether the value of a cylinder deactivation standby flag F_DCSSTB is 1. When pre-conditions for cylinder deactivation are satisfied, the value of the flag F_DCSSTB is set to 1 in step S178, while the pre-conditions are not satisfied, the value of the flag F_DCSSTB is set to 0 in step S185. If the result of the determination of step S175 is "YES", the operation proceeds to step S178, while if the result of the determination is "NO", the operation proceeds to step S176.

In step S176, it is determined whether the air-intake passage negative pressure PBGA is equal to or higher than an upper-limit negative pressure #PBGDCS defined for executing the cylinder-deactivated engine operation, where #PBGDCS is selected according to the engine speed NE from among the data stored in a specific table. In this table, the higher the engine speed, the smaller the value #PBGDCS is (i.e., the higher the negative pressure is).

This is because when the engine load is high (i.e., the air-intake passage negative pressure is lower than the upper-limit negative pressure #PBGDCS for executing the cylinder-deactivated engine operation), the cylinder-deactivated engine operation is not immediately performed but is performed after the air-intake passage negative pressure is used for securing the necessary master-power negative pressure. If the result of the determination of step S176 is "YES" (i.e., low load), the operation proceeds to step S177, while if the result of the determination is "NO" (i.e., high load), the operation proceeds to step S183.

In step S183, the value of the deceleration air-intake negative pressure increasing flag F_DECPBUP is set to 1, and the operation proceeds to step S185. When the value of the deceleration air-intake negative pressure increasing flag F_DECPBUP is 1, the second air passage 33 is closed under specific conditions, while if the value of the flag F_DECPBUP is 0, the second air passage 33 is opened under specific conditions That is, if it is determined in step S176 that the engine load is high, the negative pressure is low. Therefore, the second air passage 33 is closed (see step S183) and the cylinder-deactivated engine operation is not executed (see step S188), and when the air-intake passage negative pressure PBGA reaches a predetermined level in step S176, the operation shifts from S177 to S180, so that conditions for executing the cylinder-deactivated engine operation are satisfied (i.e., the deceleration cylinder-deactivation condition satisfied flag F_DCSCND is 1).

In step S177, the value of the deceleration air-intake negative pressure increasing flag F_DECPBUP is set to 0, and the operation proceeds to step S178. In step S178, the pre-conditions for the cylinder deactivation are satisfied; thus, the value of the cylinder deactivation standby flag F_DCSSTB is set to 1, and the operation proceeds to step S179.

In step S179, it is determined whether the value of the master-power negative pressure MPGA is equal to or higher than an upper-limit negative pressure #MPDCS for continuing the cylinder-deactivated engine operation. This #MPDCS is selected according to the vehicle speed VP from among the data stored in a specific table. In this table, the higher the vehicle speed, the smaller the value #MPDCS is (i.e., the higher the negative pressure is). Here, the master-power negative pressure MPGA is provided for stopping the vehicle. Therefore, it is preferable to define #MPDCS according to the vehicle speed VP, that is, the kinetic energy of the vehicle.

If it is determined in step S1179 that the master-power negative pressure MPGA is equal to or higher than the upper-limit negative pressure #MPDCS for continuing the cylinder-deactivated engine operation (i.e., the master-power negative pressure MPGA is high), the operation proceeds to step S180. If it is determined in step S179 that the master-power negative pressure MPGA is lower than the upper-limit negative pressure #MPDCS (i.e., the master-power negative pressure MPGA is low), the operation proceeds to step S186. This is because when the master-power negative pressure MPGA is insufficient, it is not preferable to continue the cylinder-deactivated engine operation.

In step S180, the value of the deceleration cylinder-deactivation condition satisfied flag F_DCSCND is set to 1, and the control operation is completed.

In step S184, the value of the deceleration air-intake negative pressure increasing flag F_DECPBUP is set to 0, and the operation proceeds to step S185.

In step S185, the value of the cylinder deactivation standby flag F_DCSSTB is set to 0 because the pre-conditions for the cylinder-deactivated engine operation are not satisfied.

In step S186, it is determined whether the value of the deceleration cylinder-deactivation condition satisfied flag F_DCSCND is 1. If the result of the determination is "YES", the operation proceeds to step S187, while if the result of the determination is "NO", the operation proceeds to step S1188.

In step S187, the value of the cylinder deactivation termination flag F_DCSCEND is set to 1, and then the operation proceeds to step S188.

In step S188, the value of the deceleration cylinder-deactivation condition satisfied flag F_DCSCND is set to 0, and the control operation is completed.

In the above embodiment, the brake operation (i.e., whether the brake pedal is depressed) is detected (see step S173) so as to estimate the driver's intention, and the lower-limit engine speed NDCSL for continuing the cylinder-deactivated engine operation is increased by a predetermined value #DNDCSL (see step S182). Accordingly, the cylinder-deactivated engine operation is much more easily started when the brake is on, in comparison with the brake-off state, so that the engine can be smoothly stopped and the driver's intention of reaccelerating the vehicle can be implemented without increasing the engine load, thereby improving the driveability.

In addition, in order to define the lower-limit engine speed NDCSL for continuing the cylinder-deactivated engine operation, the higher the oil temperature TOIL, the higher the lower-limit engine speed NDCSL is (see step S182 and FIG. 6), so that return from the cylinder-deactivated engine operation can be quickly performed. Therefore, highly accurate control can be performed according to the oil temperature TOIL, that is, the thermal condition of the engine.

Additionally, the brake operation is detected (see step S170B) so as to estimate the driver's intention, and one of the lower-limit brake-off vehicle speed #VPDCSL (see step S170C) and the lower-limit brake-on vehicle speed #VPDCSBL (see step S170D) is selectively used, where #VPDCSL is higher than #VPDCSBL. Therefore, the cylinder-deactivated engine operation is much more easily started when the brake is on, in comparison with the brake-off state, so that the engine can be smoothly stopped and the driver's intention of reaccelerating the vehicle can be implemented without increasing the engine load, thereby improving the driveability.

What is claimed is:

1. An engine control system in a hybrid vehicle including an engine and a motor as driving sources, wherein when the vehicle is decelerated, a cylinder-deactivated engine operation, in which at least a part of the total number of cylinders of the engine is deactivated, is performed and regeneration using the motor is performed, the system comprising:

a cylinder deactivation release determining section for releasing the cylinder-deactivated engine operation when an engine speed decreases to a reference engine speed with respect to the cylinder-deactivated engine operation; and a brake operation detecting section for detecting whether a brake pedal is depressed, wherein the cylinder deactivation release determining section includes a cylinder deactivation condition changing section for changing the reference engine speed according to whether the brake pedal is depressed, which is detected by the brake operation detecting section.

2. An engine control system as claimed in claim 1, wherein the cylinder deactivation condition changing section changes the reference engine speed according to a temperature of an engine oil.

3. An engine control system as claimed in claim 1, wherein:

the cylinder deactivation release determining section releases the cylinder-deactivated engine operation when a vehicle speed decreases to a reference lower-limit vehicle speed with respect to the cylinder-deactivated engine operation; and the cylinder deactivation condition changing section changes the reference lower-limit vehicle speed according to whether the brake pedal is depressed, which is detected by the brake operation detecting section.

4. An engine control method used in a hybrid vehicle including an engine and a motor as driving sources, wherein when the vehicle is decelerated, a cylinder-deactivated engine operation, in which at least a part of the total number of cylinders of the engine is deactivated, is performed and regeneration using the motor is performed, the method comprising:

a cylinder deactivation release determining step of releasing the cylinder-deactivated engine operation when an engine speed decreases to a reference engine speed with respect to the cylinder-deactivated engine operation; and a brake operation detecting step of detecting whether a brake pedal is depressed, wherein the cylinder deactivation release determining step includes a cylinder deactivation condition changing step for changing the reference engine speed according to whether the brake pedal is depressed, which is detected in the brake operation detecting step.

5. An engine control method as claimed in claim 4, wherein the cylinder deactivation condition changing step includes changing the reference engine speed according to a temperature of an engine oil.

6. An engine control method as claimed in claim 4, wherein:

the cylinder deactivation release determining step includes releasing the cylinder-deactivated engine operation when a vehicle speed decreases to a reference lower-limit vehicle speed with respect to the cylinder-deactivated engine operation; and the cylinder deactivation condition changing step includes changing the reference lower-limit vehicle speed according to whether the brake pedal is depressed, which is detected in the brake operation detecting step.

* * * * *